(12) United States Patent
Kano et al.

(10) Patent No.: US 11,245,321 B2
(45) Date of Patent: Feb. 8, 2022

(54) CYLINDRICAL LINEAR MOTOR

(71) Applicant: KYB CORPORATION, Tokyo (JP)

(72) Inventors: Yoshiaki Kano, Aichi (JP); Kousuke Satou, Tokyo (JP); Shinichirou Hakamada, Tokyo (JP)

(73) Assignee: KYB CORPORATION, Tokyo (JP)

( * ) Notice: Subject to any disclaimer, the term of this patent is extended or adjusted under 35 U.S.C. 154(b) by 2 days.

(21) Appl. No.: 16/636,744

(22) PCT Filed: Aug. 14, 2018

(86) PCT No.: PCT/JP2018/030278
§ 371 (c)(1),
(2) Date: Feb. 5, 2020

(87) PCT Pub. No.: WO2019/130646
PCT Pub. Date: Jul. 4, 2019

(65) Prior Publication Data
US 2020/0244153 A1      Jul. 30, 2020

(30) Foreign Application Priority Data
Dec. 28, 2017   (JP) .............................. JP2017-253631

(51) Int. Cl.
*H02K 41/03* (2006.01)
(52) U.S. Cl.
CPC .................................. *H02K 41/03* (2013.01)
(58) Field of Classification Search
CPC ........ H02K 41/00; H02K 41/02; H02K 41/03; H02K 41/031; H02K 41/035; H02K 41/0358; H02K 33/00; H02K 33/16
See application file for complete search history.

(56) References Cited

U.S. PATENT DOCUMENTS

| 5,440,183 | A | * | 8/1995 | Denne ..................... F15B 15/00 310/12.26 |
| 8,723,375 | B2 | | 5/2014 | Hiura et al. |

(Continued)

FOREIGN PATENT DOCUMENTS

| JP | 2003-134790 A | 5/2003 |
| JP | 2007-019127 A | 1/2007 |

(Continued)

OTHER PUBLICATIONS

Aug. 11, 2021, European Search Report issued for related EP application No. 18896487.8.

(Continued)

*Primary Examiner* — Tran N Nguyen
(74) *Attorney, Agent, or Firm* — Paratus Law Group, PLLC

(57) ABSTRACT

To achieve the above object, a cylindrical linear motor of the present invention includes a cylindrical linear motor includes: a core having a cylindrical yoke, and a plurality of teeth that are annular and are provided at intervals in an axial direction on an outer periphery of the yoke; a winding mounted in slots between the teeth; and a field which is cylindrical and in which the core is inwardly inserted movably in the axial direction to arrange N poles and S poles alternately in the axial direction, wherein the field has permanent magnets of a main magnetic pole radially magnetized and permanent magnets of a sub magnetic pole axially magnetized that are alternately arranged in a Halbach array in the axial direction, an axial length of the permanent magnet of the main magnetic pole is longer than an axial length of the permanent magnet of the sub magnetic pole, and the permanent magnet of the sub magnetic pole has a coercive force higher than that of the permanent magnet of the main magnetic pole.

4 Claims, 3 Drawing Sheets

(56) References Cited

U.S. PATENT DOCUMENTS

| 2004/0263003 | A1* | 12/2004 | Jack | H02K 41/03 |
| | | | | 310/14 |
| 2013/0062985 | A1* | 3/2013 | Jin | H02K 1/02 |
| | | | | 310/156.43 |
| 2014/0084731 | A1* | 3/2014 | Iwami | H02K 15/03 |
| | | | | 310/156.07 |
| 2014/0152137 | A1* | 6/2014 | Jang | H02K 21/22 |
| | | | | 310/156.12 |
| 2016/0241120 | A1 | 8/2016 | Usui | |

FOREIGN PATENT DOCUMENTS

| JP | 2010-104136 A | 5/2010 |
| JP | 2010-136516 A | 6/2010 |
| JP | 2013-106458 A | 5/2013 |
| JP | 2016-152668 A | 8/2016 |
| WO | WO 2015/072328 A1 | 5/2015 |

OTHER PUBLICATIONS

Oct. 5, 2021, Japanese Office Action issued for related JP application No. 2017-253631.

* cited by examiner

CYLINDRICAL LINEAR MOTOR

CROSS REFERENCE TO PRIOR APPLICATION

This application is a National Stage Patent Application of PCT International Patent Application No. PCT/JP2018/030278 (filed on Aug. 14, 2018) under 35 U.S.C. § 371, which claims priority to Japanese Patent Application No. 2017-253631 (filed on Dec. 28, 2017), which are all hereby incorporated by reference in their entirety.

TECHNICAL FIELD

The present invention relates to a cylindrical linear motor.

BACKGROUND ART

Some cylindrical linear motors include, for example, an armature having a cylindrical core having a plurality of teeth arranged side by side in the axial direction on the outer periphery and U-phase, V-phase, and W-phase windings mounted in slots between teeth; and a stator consisting of a cylindrical yoke provided on the outer periphery of the armature and a plurality of permanent magnets attached to the inner periphery of the base so that the S poles and the N poles are alternately arranged in the axial direction.

In the cylindrical linear motor configured in this way, when the U-phase, V-phase, and W-phase windings of the armature are appropriately energized, the armature is attracted to the permanent magnet, and the armature is driven as a movable element axially with respect to the stator.

In such a cylindrical linear motor, for example, as disclosed in JP2007-19127A, the permanent magnets in the stator are arranged in a Halbach array in which the permanent magnets of the main magnetic pole magnetized in the radial direction and the permanent magnets of the sub magnetic pole magnetized in the axial direction are arranged alternately in order to improve the thrust.

SUMMARY OF INVENTION

In the cylindrical linear motor described above, the residual magnetic flux density of the permanent magnet of the main magnetic pole is increased to improve the thrust, but since a large magnetic field acts on the permanent magnet of the sub magnetic pole in the permanent magnet of the main magnetic pole and the permanent magnet of the sub magnetic pole, the coercive force of the permanent magnet of the sub magnetic pole is made higher than that of the permanent magnet of the main magnetic pole to prevent demagnetization.

However, since the permanent magnets of the main magnetic pole and the sub magnetic pole have the same axial length, the magnetic resistance between the permanent magnet of the main magnetic pole and the armature is large, and even if the residual magnetic flux density of the permanent magnet of the main magnetic pole is increased, it is difficult to further improve the thrust of the cylindrical linear motor.

Therefore, an object of the present invention is to provide a cylindrical linear motor capable of effectively improving the thrust.

To achieve the above object, a cylindrical linear motor according to the present invention includes a core having a cylindrical yoke, and a plurality of teeth that are annular and are provided at intervals in an axial direction on an outer periphery of the yoke; a winding mounted in slots between the teeth; and a field which is cylindrical and in which the core is inwardly inserted movably in the axial direction to arrange N poles and S poles alternately in the axial direction, wherein the field has permanent magnets of a main magnetic pole radially magnetized and permanent magnets of a sub magnetic pole axially magnetized that are alternately arranged in a Halbach array in the axial direction, an axial length of the permanent magnet of the main magnetic pole is longer than an axial length of the permanent magnet of the sub magnetic pole, the permanent magnet of the sub magnetic pole has a coercive force higher than that of the permanent magnet of the main magnetic pole.

When the cylindrical linear motor is configured in this way, the axial length of the permanent magnet of the main magnetic pole can be increased to reduce the magnetic resistance between the permanent magnet of the main magnetic pole and the core, and to increase the magnetic field acting on the core. In addition, since the permanent magnet of the sub magnetic pole has a coercive force higher than that of the permanent magnet of the main magnetic pole, a permanent magnet with a high residual magnetic flux density can be used for the permanent magnet of the main magnetic pole while suppressing the demagnetization of the permanent magnet of the sub magnetic pole to which a large magnetic field is applied.

DESCRIPTION OF EMBODIMENTS

Figure 1:
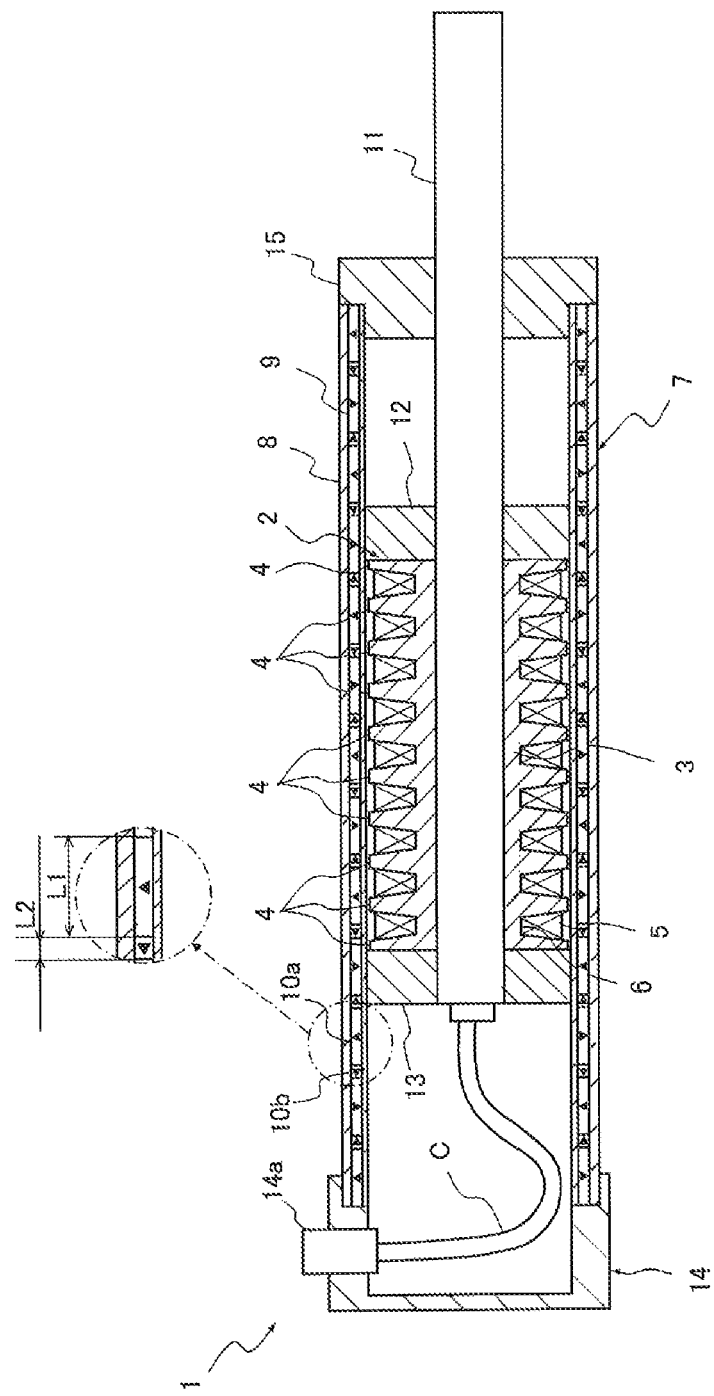
FIG. 1 is a longitudinal sectional view of a cylindrical linear motor according to one embodiment.

Hereinafter, the present invention will be described based on the embodiments illustrated in the drawings. As shown in FIG. 1, a cylindrical linear motor 1 according to one embodiment includes a core 2 having a cylindrical yoke 3 and a plurality of annular teeth 4 provided on the outer periphery of the yoke 3; a winding 5 mounted between the teeth 4, 4; and a field 7 which is cylindrical and into which the core 2 is inwardly inserted movably in the axial direction.

Hereinafter, each portion of the cylindrical linear motor 1 will be described in details. The core 2 is configured to include a cylindrical yoke 3; and a plurality of teeth 4 which are annular and are provided on the outer periphery of the yoke 3 at intervals in the axial direction, and serve as a movable element.

Figure 2:
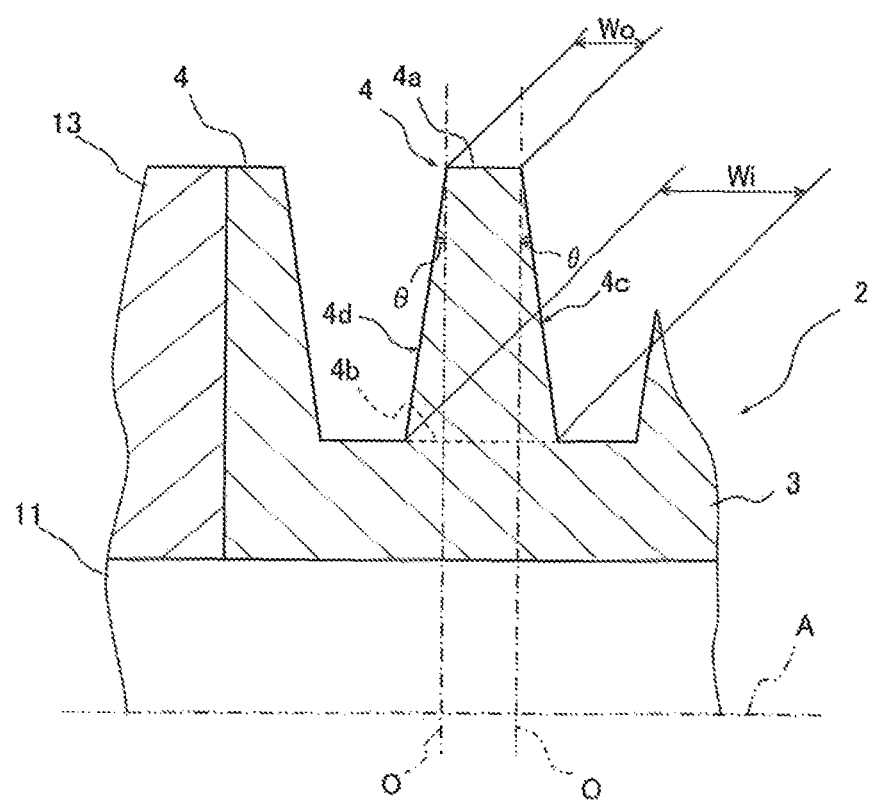
FIG. 2 is a longitudinal sectional view of a teeth portion of the cylindrical linear motor according to one embodiment.

The yoke 3 has a cylindrical shape as described above, and the thickness thereof is secured so that the sectional area thereof is equal to or larger than an area of the cross section obtained by cutting the teeth 4 with said cylinder wherever from the inner periphery to the outer periphery of the teeth 4 with the cylinder around the axis A of the core 2 (see FIG. 2).

In the present embodiment, as shown in FIGS. 1 and 2, ten teeth 4 are provided on the outer periphery of the yoke 3 at equal intervals in the axial direction, and a slot 6 consisting of spaces in which a winding 5 is mounted between the teeth 4, 4 are formed. In addition, each tooth 4 is annular and, except for the teeth 4 arranged at both ends of the core 2, has an equal-leg trapezoidal shape in which the width Wo of the outer peripheral end 4a is smaller than the width Wi of the inner peripheral end 4b in the axial direction so that the side surfaces 4c and 4d on both sides in the axial direction are tapered surfaces inclined at an equal angle with respect to the outer peripheral end 4a. Additionally, in the teeth 4 excluding the end teeth 4, an inner angle θ formed by a side surface 4c, 4d and an orthogonal plane O orthogonal to the axis of the core 2 in a cross section cut along a plane including the axis A of the core 2 is set to an angle in the range of 6 degrees to 12 degrees. Note that as shown in FIG. 2, the end teeth 4 have a cross-sectional shape in which a tooth 4 other than the end teeth 4 is cut in half on a plane orthogonal to the axis of the core 2. Thus, the cross-sectional shape of each tooth 4 is a trapezoidal shape in which the width of the outer peripheral end is smaller than the width of the inner peripheral end.

Furthermore, in the present embodiment, a total of nine slots 6 consisting of spaces are provided between the adjacent teeth 4, 4 in FIG. 1. Additionally, this slot 6 is mounted with the winding 5 wound therearound. The winding 5 is a three-phase winding of U phase, V phase and W phase. The nine slots 6 are mounted with W phase and U phase, U phase, U phase, U phase and V phase, V phase, V phase, V phase and W phase, W phase and W phase windings 5 in order from the left side in FIG. 1.

Additionally, the core 2 configured in this way is mounted on an outer periphery of a rod 11 formed of a nonmagnetic material, which is an output shaft.
Specifically, the core 2 is fixed to the rod 11 by annular stoppers 12, 13 having the right end and left end thereof fixed to the rod 11 in FIG. 1.

On the other hand, the field 7 is, in the present embodiment, configured to include an outer tube 8 formed of a cylindrical non-magnetic material; an inner tube 9 formed of a cylindrical non-magnetic material inserted into the outer tube 8; and permanent magnets 10a of an annular main magnetic pole and permanent magnets 10b of an annular sub magnetic pole, which are alternately stacked and inserted in the axial direction over the entire annular gap between the outer tube 8 and the inner tube 9. Note that the triangular marks described in the permanent magnets 10a of the main magnetic pole and the permanent magnets 10b of the sub magnetic pole in FIG. 1 indicate the magnetization direction, the magnetization direction of the permanent magnets 10a of the main magnetic pole is the radial direction, and the magnetization direction of the permanent magnets 10b of the sub magnetic pole is the axial direction. Additionally, when the permanent magnets 10a of the main magnetic pole and the permanent magnets 10b of the sub magnetic pole are stacked, each permanent magnet 10a, 10b is arranged on the inner peripheral side of the field 7 in such a direction that a region from the center to the center of the permanent magnets 10b of the sub magnetic pole on both sides sandwiching the permanent magnet 10a of the main magnetic pole serves as one magnetic pole. That is, the permanent magnets 10a of the main magnetic pole and the permanent magnets 10b of the sub magnetic pole are arranged in a Halbach array, and the S poles and the N poles are arranged so as to appear alternately in the axial direction on the inner peripheral side of the field 7.

In addition, the axial length L1 of the permanent magnet 10a of the main magnetic pole is longer than the axial length L2 of the permanent magnet 10b of the sub magnetic pole, and in the present embodiment, the axial length L1 of the permanent magnet 10a of the main magnetic pole and the axial length L2 of the permanent magnet 10b of the sub magnetic pole are set so as to satisfy $0.2 \leq L2/L1 \leq 0.4$. Since the magnetic resistance between the core 2 and the permanent magnet 10a of the main magnetic pole can be reduced and the magnetic field acting on the core 2 can be increased by increasing the axial length of the permanent magnet 10a of the main magnetic pole, the thrust of the cylindrical linear motor 1 can be improved.

Furthermore, the permanent magnet 10b of the sub magnetic pole has a coercive force higher than that of the permanent magnet 10a of the main magnetic pole. The residual magnetic flux density and the coercive force of a permanent magnet are closely related to each other, and they are generally in such a conflicting relationship with each other that increasing the residual magnetic flux density decreases the coercive force, and increasing the coercive force decreases the residual magnetic flux density. Since a large magnetic field is applied in the direction of demagnetization to the permanent magnet 10b of the sub magnetic pole in the Halbach array, the coercive force of the permanent magnet 10b of the sub magnetic pole is increased to suppress demagnetization so that a large magnetic field can act on the core 2. On the other hand, the strength of the magnetic field acting on the core 2 depends on the number of lines of magnetic force of the permanent magnets 10a of the main magnetic pole. Therefore, a permanent magnet having a high residual magnetic flux density as the permanent magnet 10a of the main magnetic pole is used so that a large magnetic field can act on the core 2. In the present embodiment, when the coercive force of the permanent magnet 10b of the sub magnetic pole is made higher than that of the permanent magnet 10a of the main magnetic pole, the material of the permanent magnet 10b of the sub magnetic pole is a material having a coercive force higher than that of the material of the permanent magnet 10a of the main magnetic pole. Therefore, the combination of the permanent magnet 10a of the main magnetic pole and the permanent magnet 10b of the sub magnetic pole can be easily realized by selecting the materials. Note that in the present embodiment, the permanent magnet 10a of the main magnetic pole is made of a material having a high residual magnetic flux density containing neodymium, iron, and boron as main components, and the permanent magnet 10b of the sub magnetic pole is made of a magnet that is hard to demagnetize obtained by adding dysprosium to the material described above.

In addition, the core 2 is inserted on the inner peripheral side of the field 7, and the field 7 causes a magnetic field to act on the core 2. Note that since the field 7 is only needed to cause a magnetic field to act on the movable range of the core 2, it is only needed to determine the installation range of the permanent magnets 10 according to the movable range of the core 2. Therefore, the permanent magnets 10a, 10b may not be provided in a range that cannot face the core 2 in the annular gap between the outer tube 8 and the inner tube 9.

In addition, the left end of the outer tube 8 and the inner tube 9 in FIG. 1 is closed by a cap 14, and the right end of the outer tube 8 and the inner tube 9 in FIG. 1 is closed by an annular rod guide 15 for guiding the axial movement of the rod 11 inserted in the inner periphery. In addition, stoppers 12, 13 are in sliding contact with the inner periphery of the inner tube 9, and the stoppers 12, 13 allow the core 2 to move smoothly in the axial direction together with the rod 11 without axial displacement with respect to the field 7. Additionally, the inner tube 9 plays a role to form a gap between the outer periphery of the core 2 and the inner periphery of each of the permanent magnets 10a, 10b, and also guide the axial movement of the core 2 in cooperation with the stoppers 12, 13.

Note that the cap 14 is provided with a connector 14a for connecting the cable C connected to the windings 5 to an external power supply (not shown), so that the windings 5 can be energized from an external power supply. In addition, the axial length of the outer tube 8 and the inner tube 9 is longer than the axial length of the core 2, and the core 2 can stroke in the left and right directions in FIG. 1 in a range of the axial length of the field 7.

Additionally, for example, by sensing the electrical angle of the winding 5 with respect to the field 7, switching the energization phase based on the electrical angle and controlling the current amount of each winding 5 by PWM control, the thrust of the cylindrical linear motor 1 and the moving direction of the core 2 can be controlled. Note that the control method described above is an example, and it is not limited thereto. Thus, in the cylindrical linear motor 1 of the present embodiment, the core 2 is an armature and a movable element, and the field 7 acts as a stator. In addition, when an external force that causes the core 2 and the field 7 to relatively displace in the axial direction is applied, the thrust for suppressing the relative displacement can be generated by energizing the winding 5 or an induced electromotive force generated in the winding 5 to cause the cylindrical linear motor 1 to dampen the vibration and motion of the device due to the external force, and the energy regeneration that generates electric power from the external force is also possible.

As described above, the cylindrical linear motor 1 of the present invention includes a cylindrical linear motor includes: a core 2 having a cylindrical yoke 3, and a plurality of teeth 4 that are annular and are provided at intervals in an axial direction on an outer periphery of the yoke 3; a winding 5 mounted in slots 6 between the teeth 4, 4; and a field 7 which is cylindrical and in which the core 2 is inwardly inserted movably in the axial direction to arrange N poles and S poles alternately in the axial direction, wherein the field 7 has permanent magnets 10a of a main magnetic pole radially magnetized and permanent magnets 10b of a sub magnetic pole axially magnetized that are alternately arranged in a Halbach array in the axial direction, an axial length L1 of the permanent magnet 10a of the main magnetic pole is longer than an axial length L2 of the permanent magnet 10b of the sub magnetic pole, and the permanent magnet 10b of the sub magnetic pole has a coercive force higher than that of the permanent magnet 10a of the main magnetic pole.

When the cylindrical linear motor 1 is configured in this way, the axial length of the permanent magnet 10a of the main magnetic pole can be increased, and the magnetic resistance between the permanent magnet 10a of the main magnetic pole and the core 2 can be reduced. Thus, the magnetic field acting on the core 2 can be increased. Also, since the permanent magnet 10b of the sub magnetic pole has a higher coercive force than the permanent magnet 10a of the main magnetic pole, while suppressing the demagnetization of the permanent magnet 10b of the sub magnetic pole to which a large magnetic field is applied, a permanent magnet having a high residual magnetic flux density can be used as the permanent magnet 10a.

Therefore, according to the cylindrical linear motor 1 of the present invention, the magnetic resistance between the permanent magnet 10a of the main magnetic pole and the core 2 can be reduced while suppressing the demagnetization of the permanent magnet 10b of the sub magnetic pole, and the thrust can be effectively improved.

Figure 3:
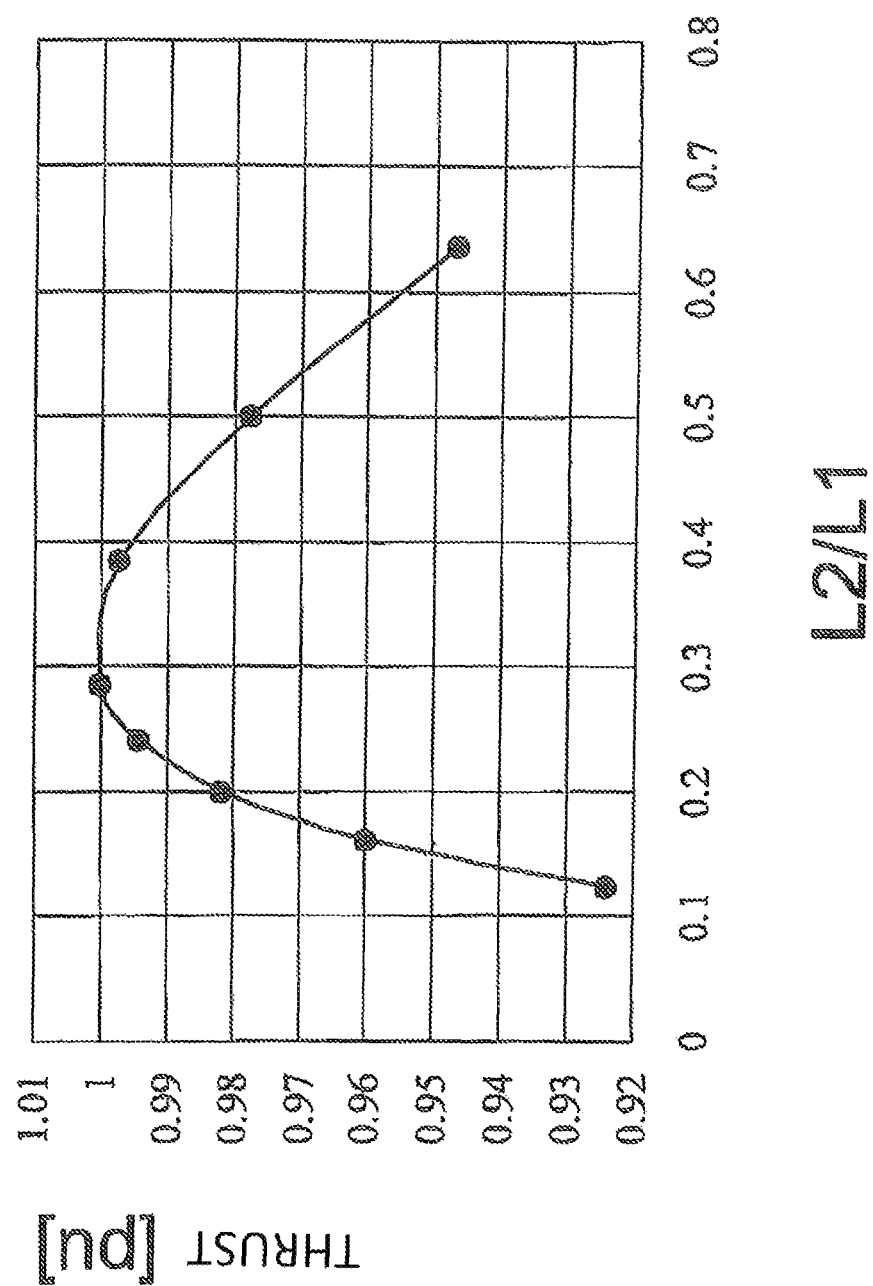
FIG. 3 is a graph showing a relationship between a value obtained by dividing an axial length L2 of a permanent magnet of a sub magnetic pole by an axial length L1 of a permanent magnet of a main magnetic pole and a thrust of the cylindrical linear actuator.

Note that the longer the axial length L1 of the permanent magnet 10a of the main magnetic pole is longer than the axial length L2 of the permanent magnet 10b of the sub magnetic pole, the more the field 7 can apply a larger magnetic field to the core 2, but the shorter the axial length of the permanent magnet 10b of the sub magnetic pole is, the lower the coercive force is and the easier the demagnetization occurs. If the permanent magnet 10b of the sub magnetic pole is demagnetized, the magnetic field of the field 7 becomes small, and thus the demagnetization of the permanent magnet 10b of the sub magnetic pole also affects the magnitude of the magnetic field. Therefore, in order to improve the thrust while avoiding demagnetization, there is an optimum relationship between the axial length L1 of the permanent magnet 10a of the main magnetic pole and the axial length L2 of the permanent magnet 10b of the sub magnetic pole. FIG. 3 shows the relationship between the value obtained by dividing the axial length L2 of the permanent magnet 10b of the sub magnetic pole by the axial length L1 of the permanent magnet 10a of the main magnetic pole and the thrust of the cylindrical linear actuator 1. As a result of extensive research, the inventors have found that, as shown in FIG. 3, if the axial length L1 of the permanent magnet 10a of the main magnetic pole and the axial length L2 of the permanent magnet 10b of the sub magnetic pole are set so as to satisfy $0.15 \leq L2/L1 \leq 0.6$, a thrust of 95% or more with respect to the thrust when the value of L2/L1 is set to an ideal value can be secured, so that the thrust of the cylindrical linear motor 1 can be further improved while avoiding demagnetization. Therefore, if the axial length L1 of the permanent magnet 10a of the main magnetic pole and the axial length L2 of the permanent magnet 10b of the sub magnetic pole in the cylindrical linear motor 1 are set so as to satisfy $0.15 \leq L2/L1 \leq 0.6$, the thrust can be further improved while avoiding the demagnetization of the permanent magnet 10b of the sub magnetic pole. Furthermore, as can be understood from FIG. 3, when the axial length L1 of the permanent magnet 10a of the main magnetic pole and the axial length L2 of the permanent magnet 10b of the sub magnetic pole are set so as to satisfy $0.2 \leq L2/L1 \leq 0.5$, a thrust of 98% or more with respect to the thrust when the value of L2/L1 is set to an ideal value can be secured, so that the thrust of the cylindrical linear motor 1 can be more effectively improved while avoiding demagnetization.

In addition, in the present embodiment, when making the coercive force of the permanent magnet 10b of the sub magnetic pole higher than that of the permanent magnet 10a of the main magnetic pole, the material of the permanent magnet 10b of the sub magnetic pole is a material having a coercive force larger than that of the material of the permanent magnet 10a of the main magnetic pole. Therefore, the combination of the permanent magnet 10a of the main magnetic pole and the permanent magnet 10b of the sub magnetic pole can be easily realized by selecting the materials.

Furthermore, since the cross-sectional shape of the teeth 4 is a trapezoidal shape in which the width of the outer peripheral end is smaller than the width of the inner peripheral end in the cylindrical linear motor 1 of the present embodiment, the magnetic path cross-sectional area at the inner peripheral end is larger than that in the case of the cross-sectional shape of the teeth 4 being a rectangular shape. Therefore, since a large magnetic path cross-sectional area can be easily secured, magnetic saturation when the windings 5 are energized can be suppressed, and a larger magnetic field can be generated in the cylindrical linear motor 1 configured in this way, a larger thrust can be generated. Note that the teeth 4 may have a trapezoidal cross-sectional shape in order to improve the thrust, but may have a rectangular cross-sectional shape or another shape.

Note that according to the research of the inventors, it was found that when the internal angle θ formed between the side surfaces 4c, 4d in the cross section of the teeth 4 and the orthogonal plane O is in the range of 6 degrees to 12 degrees, a good mass thrust density can be obtained. Here, the mass thrust density is a value obtained by dividing the maximum thrust of the cylindrical linear motor 1 having the above-described configuration by the mass, and if the mass thrust density is improved, the thrust per mass of the cylindrical linear motor 1 increases. Therefore, a large thrust is obtained in the cylindrical linear motor 1 in which the internal angle θ formed between the side surfaces 4c, 4d in the cross section of the teeth 4 and the orthogonal plane O is in the range of 6 degrees to 12 degrees.

Although the preferred embodiments of the present invention have been described above in detail, modifications, variations and changes are possible without departing from the scope of the claims.

The invention claimed is:

1. A cylindrical linear motor comprising:
    a core having a cylindrical yoke, and a plurality of teeth that are annular and are provided at intervals in an axial direction on an outer periphery of the yoke;
    a winding mounted in slots between the teeth; and
    a field that is cylindrical and into the cylindrical field the core is inwardly inserted movably in the axial direction, wherein the field comprises N poles and S poles alternately arranged in the axial direction, wherein
    the field has permanent magnets of a main magnetic pole radially magnetized and permanent magnets of a sub magnetic pole axially magnetized that are alternately arranged in a Halbach array in the axial direction,
    an axial length of the permanent magnet of the main magnetic pole is longer than an axial length of the permanent magnet of the sub magnetic pole, and
    the permanent magnet of the sub magnetic pole is made of a magnet that is harder to demagnetize than the permanent magnets of the main magnetic pole, obtained by adding dysprosium to materials forming the permanent magnets of the main magnetic pole, and has a coercive force higher than that of the permanent magnet of the main magnetic pole.

2. The cylindrical linear motor according to claim 1, wherein
    when the axial length of the permanent magnet of the main magnetic pole is L1 and the axial length of the permanent magnet of the sub magnetic pole is L2, the axial length of the permanent magnet of the main magnetic pole and the axial length of the permanent magnet of the sub magnetic pole are set so as to satisfy 0.15≤L2/L1≤0.6.

3. The cylindrical linear motor according to claim 2, wherein
    when the axial length of the permanent magnet of the main magnetic pole is L1 and the axial length of the permanent magnet of the sub magnetic pole is L2, the axial length of the permanent magnet of the main magnetic pole and the axial length of the permanent magnet of the sub magnetic pole are set so as to satisfy 0.2≤L2/L1≤0.5.

4. The cylindrical linear motor according to claim 1, wherein
    the cross-sectional shape of each tooth, except for the teeth arranged at both ends of the core, has an equal-leg trapezoidal shape in which a width of an outer peripheral end is smaller than a width of an inner peripheral end in the axial direction.

* * * * *